United States Patent [19]

Jobe

[11] Patent Number: 4,510,889

[45] Date of Patent: Apr. 16, 1985

[54] PARASITE CONTROL BATH UNIT

[76] Inventor: A. Louise Jobe, Rte. 2, Box 116, Guymon, Okla. 73942

[21] Appl. No.: 604,176

[22] Filed: Apr. 26, 1984

[51] Int. Cl.³ .............................................. A01K 13/00
[52] U.S. Cl. ................................................... 119/159
[58] Field of Search ......................................... 119/159

[56] References Cited

U.S. PATENT DOCUMENTS

| 2,480,600 | 8/1949 | Paul, Jr. | 119/159 |
| 2,524,641 | 10/1950 | Suttles, Jr. | 119/159 |
| 2,595,781 | 5/1952 | Durham | 119/159 |

Primary Examiner—Hugh R. Chamblee

[57] ABSTRACT

This parasite control bath unit is designed for spraying steers. Primarily, it consists of a housing that is secured to a pair of runners or skids, and the runners serve as reservoirs for the exterminating chemicals, which are recycled after the steers are sprayed.

1 Claim, 3 Drawing Figures

PARASITE CONTROL BATH UNIT

This invention relates to pesticide depositing devices, and more particularly, to a parasite control bath unit.

The principal object of this invention is to provide a parasite control bath unit, which will be adaptable to be employed in the field for controlling parasites on young steers.

Another object of this invention is to provide a parasite control bath unit, which will be mobile, by being mounted on runners, so as to be moved easily when desired.

Another object of this invention is to provide a parasite control bath unit, which will include a housing with properly disposed spray nozzles, for spraying a suitable parasite exterminating chemical onto cattle within the confines of the housing, and the design will be such, that the chemical or chemicals will be recycled by the unit.

A further object of this invention is to provide a parasite control bath unit, which will include self-contained compressor and hydraulic means, for its effective operation.

A still further object of this invention is to provide a parasitic control bath unit, which will be so designed, as to have the runner or skids of the unit serving as holding or storage tanks for the chemicals used for spraying the steers.

Other objects are to provide a parasite control bath unit, which is simple in design, inexpensive to manufacture, rugged in construction, easy to use, and efficient in operation.

These, and other objects, will be readily evident, upon a study of the following specification, and the accompanying drawing, wherein.

Figure 1:
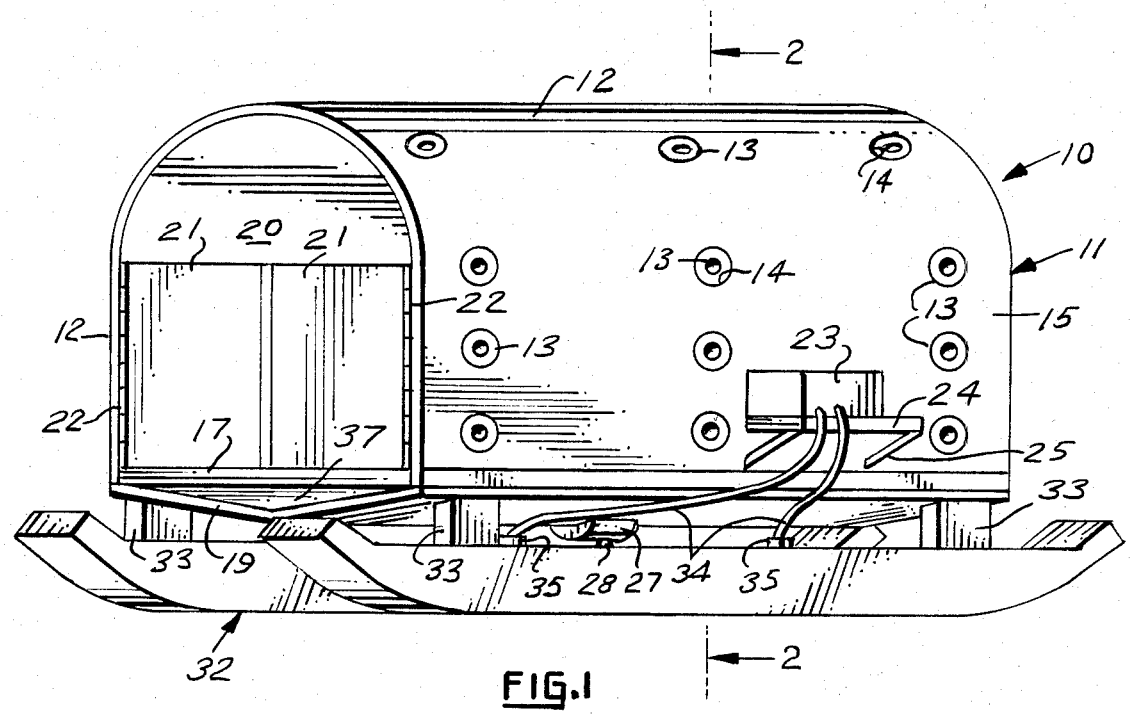
FIG. 1 is a perspective view of the present invention.
Figure 2:
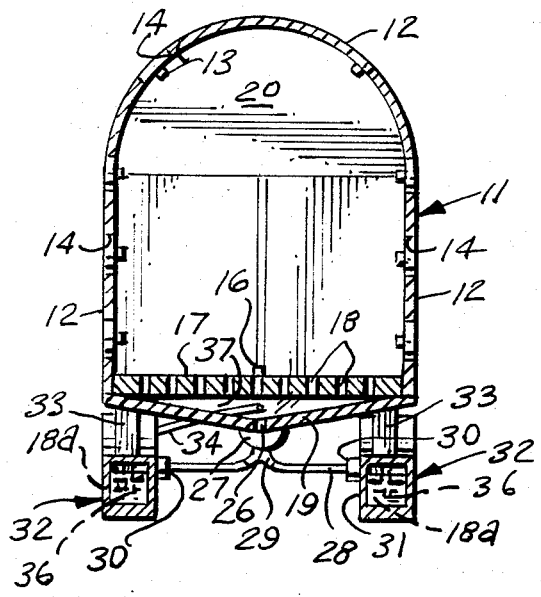
FIG. 2 is a cross-sectional view, taken along the line 2—2 of FIG. 1.
Figure 3:
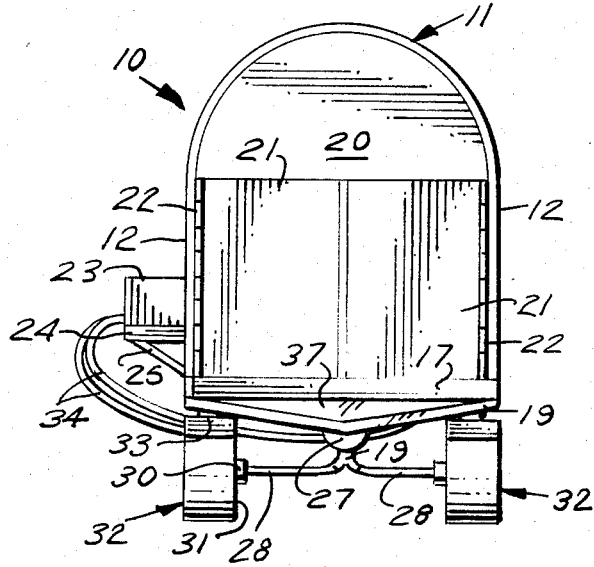
FIG. 3 is a rear elevational view of FIG. 1.

Accordingly, a unit 10 is shown to include an elongated housing 11, fabricated of a suitable non-corrosive metal, and having a rounded top portion 12. A plurality of spaced spray nozzles 13 are fixedly secured within openings 14, through the side portions 15 and the rounded top portion 12, in a suitable manner, and similar nozzles 16 are similarly secured in openings (not shown) through floor 17, which is fixedly secured at its longitudinal edges, in a suitable manner (not shown), to the inside bottom of side portions 15 of housing 11. Nozzles 13 and 16 are so positioned, as to spray the steers from all angles, including their undersides, and floor 17 is provided with a plurality of equally spaced slots 18, for drainage of chemicals 18a to a sub-floor 19, therebeneath. Housing 11 is preferably eight feet wide and fourteen feet long, so as to enable it to hold and support twelve to fifteen young steers. Housing 11 includes a top end wall 20 on each end, which is suitably fixedly secured, at its arcuate peripheral edges, to the inside ends of the top portion 12 of housing 11. A pair of gates 21, on each end of housing 11, are hinged thereto, by means of hinges 22, in the manner known in the art, and not shown. Gates 21 are hydraulically operated by pump, lines, cylinders, and controls, (not shown) which are common in the art, and gates 21 serve to prevent the steers from leaving unit 10 when spraying takes place. Preferably, the hydraulic components, such as the pump, will be located within the box 23, which houses the compressor of the unit 10, and box 23 is suitably secured to the top of a platform 24, which is fixedly secured, at one longitudinal edge, to one side portion 15 of housing 11, in a suitable manner (not shown). Platform 24 is also provided with support struts 25 for further strength, as is known in the art. Sub-floor 19 is angled downward at its center portion, along the longitudinal axis of housing 11, and includes a central drain opening 26, for the return of the sprayed chemicals into a filter 27, which is secured in a suitable manner to the center bottom of sub-floor 19, and a pair of drain lines 28 are coupled thereto, by a fitting 29. The ends of lines 28 are secured to fittings 30, which are secured to one side 31 of holding or storage tanks 32, which serve as a reservoir for chemicals 18a, and are the runners or skids for housing 11. A pair of legs 33 are fixedly secured, at one end, to the top of each tank 32 in a suitable manner (not shown) and are similarly secured at their opposite ends to the bottom of sub-floor 19, so as to support housing 11, and a pair of hoses 34 are coupled at one end to fittings 35, secured to the top of tanks 32, and an inlet pipe 36 is secured to fittings 35 within tanks 32, for picking up chemicals 18a, which are pumped upward into spray nozzles 13 and 16 by the pump and compressor means contained within box 23 mounted to housing 11.

In use, one pair of gates 21 are opened by the operator, through the hydraulic controls provided, and the steers are herded inside of housing 11. The gates 21 are then hydraulically closed, to prevent the steers from exiting from housing 11. The compressor is then operated to force chemicals 18a upward from tanks 32, via hoses 34, into the spray nozzles 13 and 16, by hoses connected thereto, which are common in the art and not shown. The sprayed chemicals 18a spray the steers from the top sides, and bottom, and then flow through the slots 18 of the floor 17, and down to sub-floor 19, where they drain through opening 26 into filter 27, and then through lines 28 into the tanks 32. After spraying the steers, the gates 21 on the opposite end of housing 11 are hydraulically opened, and the steers are then released from unit 10.

It shall be noted, that an end wall 37 is fixedly secured to the bottom of floor 17, and to the end portions of sub-floor 19, for confining chemicals 18a, and unit 10 is placed in a level position, prior to its operation.

While various changes may be made in the detail construction, it is understood that such changes will be within the spirit and scope of the present invention, as is defined by the appended claim.

I claim:

1. A parasite control bath unit, comprising, in combination, an elongated housing including a pair of opposite side walls, an upwardly rounded roof, and horizontal floor, a pair of adjacent hinged gates at each opposite end of said housing, for admitting and exiting a plurality of cattle, and a partial end wall between said roof and an upper edge of each said pair of adjacent gates; a sub-floor of "V"-shaped transverse configuration under said floor, and opposite end walls between said floor and said sub-floor defining a chamber therebetween; a pair of longitudinally extending runners in spaced relation below said sub-floor, and a plurality of posts between said runners and said sub-floor, for supporting said housing thereupon; and a chemical spraying system on said unit, for controlling parasites on said cattle, said spraying system comprising chemical storage tanks inside said runners, a plurality of spray openings in said side walls, said roof and said floor, spray nozzles in said spray openings for spraying said cattle when inside said housing, a plurality of hose lines between said tanks and said nozzles, pump means along said hose lines moving a parasite control chemical from said tanks to said nozzles; a plurality of drain holes through said floor for sprayed said chemical draining down into said chamber, and drain hoses from said chamber to said tanks.

* * * * *